United States Patent [19]

Ardon et al.

[11] Patent Number: 4,866,708
[45] Date of Patent: Sep. 12, 1989

[54] COMMUNICATION CHANNEL OWNERSHIP ARRANGEMENT

[75] Inventors: Menachem T. Ardon, Naperville; John P. Sassano, Wheaton, both of Ill.

[73] Assignee: American Telephone and Telegraph Company, AT&T Bell Laboratories, Murray Hill, N.J.

[21] Appl. No.: 115,081

[22] Filed: Oct. 28, 1987

[51] Int. Cl.$^4$ .............................................. H04J 3/16
[52] U.S. Cl. ..................... 370/95.1; 379/274
[58] Field of Search ................... 370/54, 58, 89, 95; 379/269, 8, 273, 274

[56] References Cited

U.S. PATENT DOCUMENTS

| | | | |
|---|---|---|---|
| 2,769,864 | 11/1956 | Parks | 179/18 |
| 3,391,252 | 7/1968 | Germanton | 179/18 |
| 3,643,032 | 2/1972 | Ulrich et al. | 179/18 |
| 3,860,761 | 1/1975 | O'Neill, Jr. | 179/18 |
| 4,038,497 | 7/1977 | Collins et al. | 179/15 |
| 4,259,549 | 3/1981 | Stehman | 179/18 |
| 4,317,962 | 3/1982 | Cox et al. | 179/18 |
| 4,322,843 | 3/1982 | Beuscher et al. | 70/63 |
| 4,340,776 | 7/1982 | Ganz | 178/3 |
| 4,377,859 | 3/1983 | Dunning et al. | 370/58 |
| 4,421,955 | 12/1983 | Mori et al. | 179/18 |
| 4,442,321 | 4/1984 | Stehman | 179/18 |
| 4,530,092 | 7/1985 | Hafer | 370/66 |
| 4,550,404 | 10/1985 | Chodrow et al. | 370/110.1 |
| 4,621,357 | 11/1986 | Naiman et al. | 370/58 |
| 4,644,528 | 2/1987 | Ahmad et al. | 370/58 |
| 4,686,672 | 8/1987 | Namiki | 370/55 |
| 4,713,806 | 12/1987 | Oberlander et al. | 370/58 |
| 4,720,854 | 1/1988 | Sand | 379/269 |
| 4,763,325 | 8/1988 | Wolfe et al. | 370/95 |

FOREIGN PATENT DOCUMENTS

| | | |
|---|---|---|
| 0005687 | 11/1979 | European Pat. Off. . |
| 0228204 | 7/1987 | European Pat. Off. . |
| 54-14604 | 3/1979 | Japan . |

OTHER PUBLICATIONS

H. Takeda et al., "Time Division Switching Control System", *Review of the Electrical Communication Laboratories*, vol. 27, No. 9-10, Sep.–Oct. 1979, pp. 773-782.

G. Becker et al., "Call Processing In a Distributed Control System", *ICC '80 Conference Record*, vol. 3 of 3, Jun. 8-12, 1980, pp. 46.4.1-46.4.7.

D. Jackson and K. Patfield, "Impacts of Multiprocessing on GTD-5 EAX Call Processing and Operating System", ISS'81 CIC Montreal 21-25, Sep. 1981, pp. 1-7.

M. Akiyama et al., "Time Division Distribued Switching System", ISS'81 CIC Montral 21-25 Sep. 1981, pp. 1-7.

*Primary Examiner*—Robert L. Griffin
*Assistant Examiner*—Frank M. Scutch, III
*Attorney, Agent, or Firm*—Ross T. Watland

[57] ABSTRACT

A communication channel ownership arrangement where two call units (switching modules) each own certain ones of the bidirectional channels between the units. By virtue of ownership, a call unit can immediately assign owned channels to calls without consulting the other call unit. While the ownership of channels to calls may be artibrary at system initialization, ownership is modifiable on a per-call basis to dynamically adapt to the actual directional traffic patterns that are present at a given time to minimize the coordination and communication required between the call units.

42 Claims, 8 Drawing Sheets

FIG. 4
RESERVATION/OWNERSHIP TABLE FOR SM 3000-N

| CHANNEL | RESERVED/ NONRESERVED | RESERVED TO SM 3000- | OWNED BY SM 3000- |
|---|---|---|---|
| TS 0 | 1 | 2 | N |
| TS 1 | 0 | - | N |
| TS 2 | 1 | 14 | 14 |
| TS 3 | 1 | 7 | N |
| TS 4 | 0 | - | N |
| ⋮ | ⋮ | ⋮ | ⋮ |
| TS 9 | 1 | 1 | N |
| ⋮ | ⋮ | ⋮ | ⋮ |
| TS 130 | 1 | 1 | N |
| ⋮ | ⋮ | ⋮ | ⋮ |
| TS 160 | 1 | 1 | 1 |
| ⋮ | ⋮ | ⋮ | ⋮ |
| TS 202 | 1 | 1 | N |
| ⋮ | ⋮ | ⋮ | ⋮ |
| TS 390 | 1 | 1 | 1 |
| ⋮ | ⋮ | ⋮ | ⋮ |
| TS 410 | 1 | 1 | N |
| ⋮ | ⋮ | ⋮ | ⋮ |
| TS 511 | 1 | 7 | 7 |

FIG. 5
CALL ASSIGNMENT TABLE FOR SM 3000-N

| CALL ID | ASSIGNED CHANNEL |
|---|---|
| 1 | TS 14 |
| 2 | TS 191 |
| 3 | TS 64 |
| 4 | TS 490 |
| ⋮ | ⋮ |

FIG. 6
BIT MAP X FOR SM 3000-N

| 0 | 1 | 2 | 3 | 4 | ... | 511 |
|---|---|---|---|---|-----|-----|
| 1 | 0 | 1 | 1 | 1 | . . . . . . . . . . . . | 1 |

0 — NONRESERVED AND IDLE
1 — OTHERWISE

FIG. 7
BIT MAP Y FOR SM 3000-N

| 0 | 1 | 2 | 3 | 4 | ... | 511 |
|---|---|---|---|---|-----|-----|
| 0 | 0 | 1 | 1 | 0 | . . . . . . . . . . . . | 1 |

0 — OWNED BY SM 3000-N AND IDLE
1 — OTHERWISE

FIG. 8
BIT MAP Z FOR SM 3000-N

| 0 | 1 | 2 | 3 | 4 | ... | 511 |
|---|---|---|---|---|-----|-----|
| 0 | 0 | 0 | 0 | 0 | . . . . . . . . . . . . | 1 |

0 — IDLE
1 — BUSY

COMMUNICATION CHANNEL OWNERSHIP ARRANGEMENT

CROSS-REFERENCE TO RELATED APPLICATIONS

This application is related to the application of M. T. Ardon and J. P. Sassano, now issued as U.S. Pat. No. 4,805,166, filed concurrently herewith and assigned to the assignee of the present invention.

BACKGROUND AND PROBLEM

A condition known as glare can occur in communications networks whenever two switching units attempt to establish calls using the same interconnecting path at the same time. One administrative method for minimizing the likelihood of glare, for example in seizing two-way trunks between switching offices, is to seize trunks from one office in descending numerical order, starting with the highest numbered trunk, and trunks from the other office in ascending numerical order, starting with the lowest numbered trunk. However, under typical high traffic conditions, most of the trunks are busy and the likelihood of glare in seizing the few remaining idle trunks is unacceptably high.

U.S. Pat. No. 4,644,528 issued to M. Ahmad et al. on Feb. 17, 1987, discloses an arrangement where two remote switching modules (RSMs) have 23 channels or time slots on an interconnecting transmission facility for inter-module calls. The first RSM is defined to be the controller of time slots 1 through 12 on the transmission facility and the second RSM is defined to be the controller of time slots 13 through 23. Each RSM maintains a time slot status map defining the busy/idle status of each time slot on the transmission facility. If the first RSM is processing a call to the second RSM, the first RSM determines whether one of the time slots 1 through 12 is available by reading its time slot status map. If an available time slot is found, the first RSM assigns it to the call. However, if no available time slot is found, the first RSM informs the second RSM of the need to assign a time slot to a call and the second RSM reads its time slot status map to determine whether one of the time slots 13 through 23 is available. If an available time slot is found, the second RSM assigns it to the call. Although the Ahmad arrangement definitively prevents glare, under high traffic conditions and particularly in circumstances where most of the calls are originated from one of the RSMs, a relatively large percentage of calls will require coordination and control communication between RSMs and a sequential status map search by first one and then the other RSM. This results not only in substantial processing and control message overhead, but also in an increased post-dialing delay.

In view of the foregoing, a recognized problem in the art is the inefficiency of known glare-prevention arrangements, particularly under heavy or highly directional traffic conditions. The problem is further complicated in a distributed control switching system where multiple switching entities are coordinating path assignments through an interconnecting switching network, rather than on a fixed transmission facility between only two endpoints.

SOLUTION

The foregoing problem is solved and a technical advance is achieved in accordance with the principles of the invention in an exemplary communication channel ownership arrangement where two call units (switching modules in FIG. 1) each own certain ones of the bidirectional channels between the units and, by virtue of such ownership, can immediately assign owned channels to calls advantageously without consulting the other call unit. While the ownership of channels may be arbitrary at system initialization, ownership is modifiable, significantly on a per-call basis, to dynamically adapt to the actual directional traffic patterns that are present at a given time to minimize the coordination and communication required between the call units.

An exemplary call processing method in accordance with the invention is used in an arrangement having a plurality of bidirectional communication channels (for example, two-way trunks) between first and second call units. Initially, at least one channel is defined as being owned by the first call unit and at least one other channel is defined as being owned by the second call unit. In response to a call request for a call between the two call units, a first check is made to determine whether there is an idle channel that is presently owned by the first call unit. If there is none, a second check is made to determine whether there is an idle channel that is presently owned by the second call unit. If the second check yields an idle channel owned by the second call unit, that channel is redefined as being owned instead by the first call unit. The channel is also assigned for the call between the two call units. The call processing sequence is such that channels owned by the first call unit are assignable for calls originated from the first call unit and channels owned by the second call unit are assignable for calls originated from the second call unit. Alternatively, channels owned by the first call unit are assignable for calls terminated to the first call unit and channels owned by the second call unit are assignable for calls terminated to the second call unit.

An exemplary method in accordance with the invention is also usable in an arrangement having a plurality of call units (switching modules in FIG. 1) each for communicating in and storing status information for an associated plurality of channels. A switch (communications module in FIG. 1) provides switched connections among the call units such that each of the channels associated with any given call unit is connectable with a corresponding channel associated with any other call unit. A first check is made in response to a call request for a call between first and second call units to determine whether there is a channel associated with the first call unit that is defined by the status information stored by the first call unit as presently, idle, reserved for connecting the first and second call units, and owned by the first call unit. If such channel is found, that channel and a corresponding channel associated with the second call unit are assigned for the call. Otherwise, a second check is made to determine whether there is a channel associated with the second call unit that is defined by the status information stored by the second call unit as presently idle, reserved for connecting the first and second call units, and owned by the second call unit. When a channel is found during the second check, it and a corresponding channel associated with the first call unit are assigned for the call. In addition, the status information stored by the first and second call units is changed to define such channels as being owned instead by the first call unit.

If the first two checks are unsuccessful in finding a channel for assignment to the call, third, fourth, and fifth checks are successively performed as required. The third check is made for a channel that is presently idle and owned by one of the call units and that has a corresponding channel of the other call unit that is idle and not reserved. If the third check is unsuccessful in finding a channel, a fourth check is made for a channel that is presently idle and owned by one of the call units and that has a corresponding channel that is idle and owned by the other call unit. If the fourth check is unsuccessful in finding a channel, a fifth check is made simply for any corresponding idle channels. A channel found during the third, fourth, or fifth checks, is assigned, together with its corresponding channel, for the call. In addition, the status information is changed in the two call units to define such assigned channels as being reserved for connecting the first and second call units and as being owned by one of the call units.

DRAWING DESCRIPTION

FIGS. 4 through 8 show various data structures stored in one of the switching modules of the system of FIG. 1 for use in implementing the present invention.

DETAILED DESCRIPTION

Figure 1:
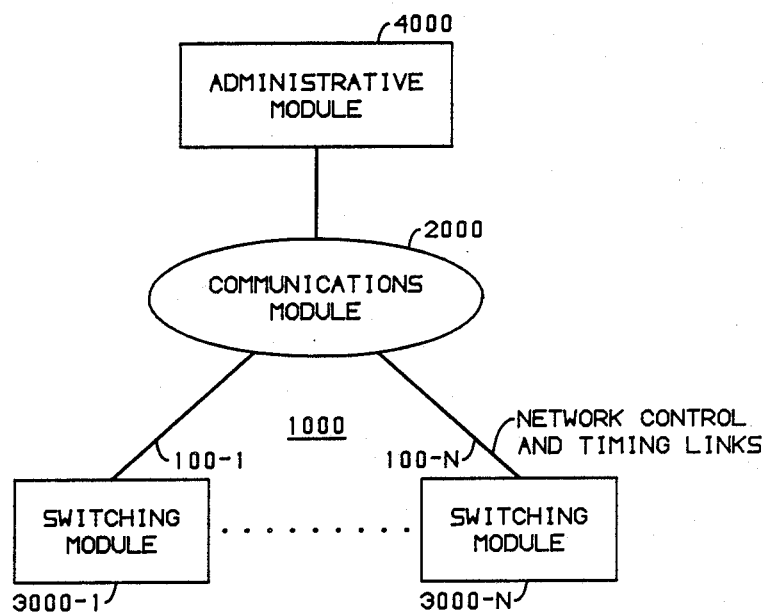
FIG. 1 is a block diagram of an illustrative switching system implementing the present invention.

Switching system 1000 (FIG. 1) has three major components: an administrative module (AM) 4000 that provides systemwide administration, maintenance, and resource allocation; a communications module (CM) 2000 that provides a hub for distributing and switching voice or digital data, control information, and synchronization signals; and a number of switching modules (SMs) 3000-1, 3000-N that perform local switching and control functions and that provide interfaces to subscriber lines and interexchange circuits.

AM 4000 provides the system-level interfaces required to operate, administer, and maintain system 1000. It performs functions that can most economically be done globally, such as common resource allocation and maintenance control. For reliability, AM 4000 includes fully duplicated processors and the two processors work in an active/standby configuration. In normal operation the active processor has control and, at the same time, keeps the data in the standby processor up to date. Thus when a fault occurs in the active processor, the standby processor is switched into service with no loss of data.

AM 4000 performs many call-processing support functions, including systemwide craft maintenance access, diagnostic and exercise control and scheduling, software recovery and initialization, and certain fault-recovery and error-detection functions best done on a centralized basis. Within AM 4000, there is error-checking circuitry for detecting and isolating faults. AM 4000 also performs administrative functions and provides software access to external data links and to disk storage (not shown).

Figure 2:
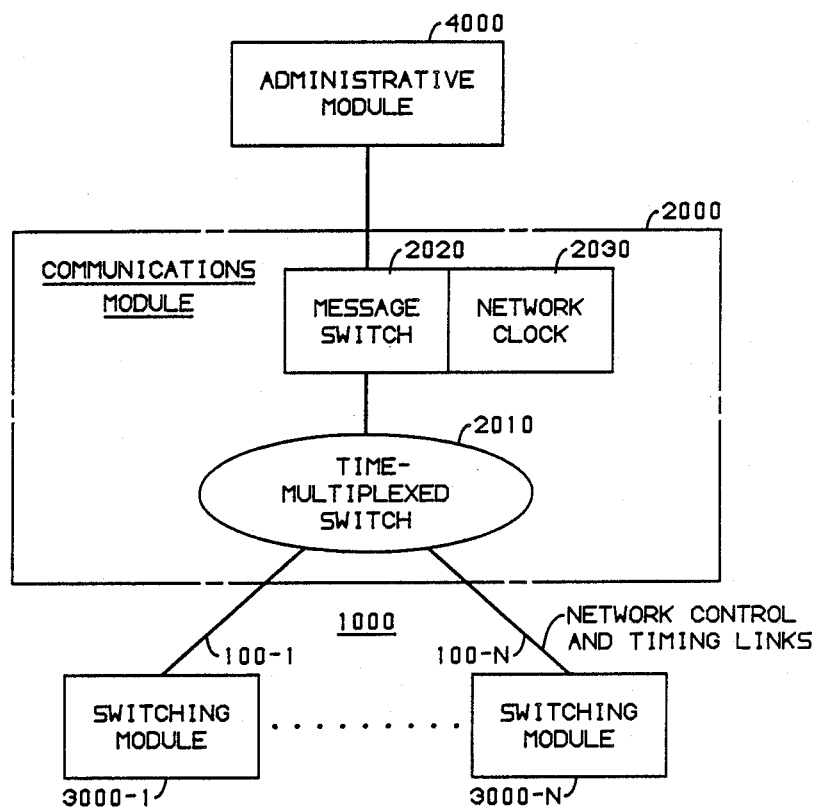
FIG. 2 is a block diagram of the system of FIG. 1 with a communications module of the system shown in more detail.

The basic function of CM 2000 (FIG. 2) is to provide consistent communications between the SMs, and between AM 4000 and the SMs. A message switch (MSGS) 2020 transfers call-processing and administrative messages between the SMs and AM 4000, and between any two SMs. MSGS 2020 performs a packet-switching function within system 1000 utilizing the well-known X.25 level-2 protocol to transfer control messages through CM 2000 and its terminating network control and timing (NCT) links 100-1, 100-N. This protocol includes error detection, positive message acknowledgement, and message retransmission in the event of a transmission error. A network clock 2030 provides the clock signals that synchronize the time-division network. Clock 2030 is synchronized through an external source or runs on an internal reference basis with periodic updating.

Figure 3:
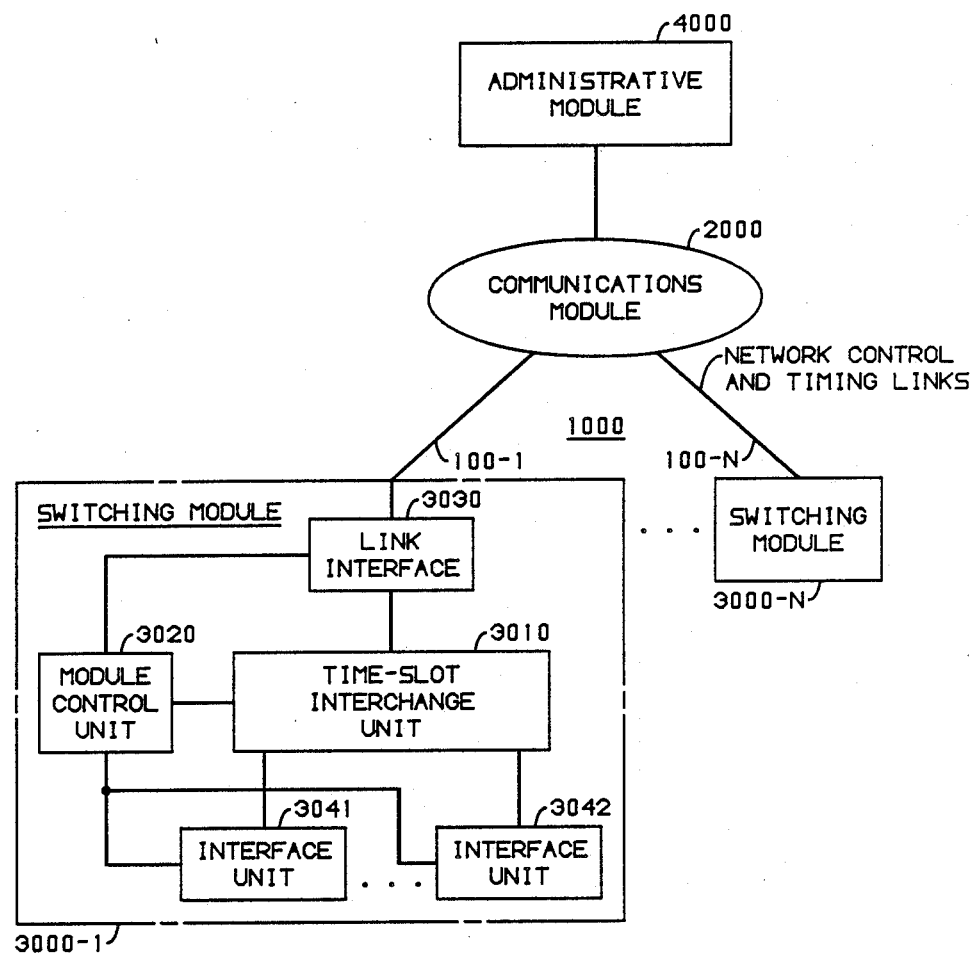
FIG. 3 is a block diagram of the system of FIG. 1 with a switching module of the system shown in more detail.

System 1000 uses a time-space-time architecture. As illustrated in FIG. 3, a time-slot interchange unit (TSIU) in each SM performs the time-division switching; a time-multiplexed switch (TMS) 2010 in CM 2000 (FIG. 2) performs the time-shared space-division switching. At each interface unit (FIG. 3) the outputs from lines and trunks are converted into 16-bit time slots. These bits are used for signaling, control, and parity, and for binary-coded voice or data. The time slots are switched through the TSIU and time-multiplexed on NCT links to TMS 2010.

TMS 2010 (FIG. 2) is a single-stage switching network that provides the digital paths for switched connections between the modules and for control messages among modules. TMS 2010 interconnects the modules via the NCT links. Each NCT link carries 256 channels (time slots) of multiplexed data in a 32.768-Mb/s serial bit stream. One of the time slots carries control messages, and the remaining 255 time slots carry digitized voice or data. Two NCT links are associated with each switching module, thus allowing 512 time slots to be routed to and from TMS 2010. (However, only a single line 100-1 is shown in the drawing to represent both NCT links between SM 3000-1 and CM 2000.) Setting up a path between a line or trunk on two SMs involves finding an idle time slot on one of the NCT links to each SM. A path is then set up through TMS 2010 between the two NCT links using the selected time slot. The TSIU in each SM establishes a path between the selected NCT time slot and the peripheral time slot associated with the line or trunk. (Since the paths are bidirectional, one NCT time slot is needed for each direction of transmission. In the present embodiment however, the time slots for the two directions are selected to have the same number.)

One of the signaling bits of the 16-bit time slots on the NCT links to TMS 2010, referred to as the E-bit, is used for continuity verification between SMs after an inter-SM call has been set up through TMS 2010. For example, after a call between SM 3000-1 and SM 3000-N has been set up through TMS 2010 using a particular time slot, both SM 3000-1 and SM 3000-N begin transmitting a logic one E-bit in the particular time slot as a continuity signal and both also begin scanning the E-bit of the particular time slot received from the other SM. The call setup procedure is not considered complete until both SM 3000-1 and SM 3000-N have detected the E-bit continuity signal from the other SM.

SMs such as SM 3000-1 (FIG. 3) provide call-processing intelligence, the first stage of switching network, and line and trunk terminals. SMs differ in the types and quantities of interface equipment they contain, depending upon the characteristics of the lines or trunks terminating thereon. Certain equipment is however, common to all SMs. The common equipment includes a link interface 3030, a TSIU 3010, and a module control unit 3020. Link interface 3030 provides a two-way interface between each SM and TMS 2010 in CM 2000. Module control unit 3020 controls call processing, call distribution, and maintenance functions. A variety of interface units 3041, 3042 are available in system 1000. Line units provide interfaces to analog lines. Trunk units provide interfaces to analog trunks. Digital line trunk units provide interfaces to digital trunks and remote SMs, while digital carrier line units provide the interface to digital carrier systems. Integrated services line units provide interfaces to digital ISDN lines. Each SM can accommodate any mixture of these units, with up to 510 channels. Two time slots are used for control.

TSIU 3010 includes a signal processor, which handles address and signaling information and a control interface, which distributes control signals to and from the interface units. TSIU 3010 switches time slots between the interface units in an SM and connects time slots from the interface units to time slots on NCT links. TSIU 3010 switches 512 time slots—256 from each of the NCT links between SM 3000-1 and CM 2000—and 512 peripheral time slots from the interface units. TSIU 3010 can connect any of its 512 peripheral time slots to any other peripheral time slot, or to any time slot of either NCT link to CM 2000.

Recall that there are 512 channels (time slots) TS0 through TS511 between a given SM and TMS 2010 (FIG. 2) and that setting up a path for an inter-module call between SM 3000-1 and SM 3000-N involves finding a channel that is idle on link 100-1, for example TS44, and that has a corresponding idle channel TS44 on link 100-N. Each SM stores information defining the status of the channels between that SM and TMS 2010. After an inter-module call is over, the corresponding channels are marked idle in the two SMs, but the two SMs agree to reserve the corresponding channels for future calls between themselves. The corresponding channels together with the TMS 2010 connection between them comprise a reserved path between the two SMs. In most cases, reserved paths can be used for subsequent calls thus avoiding the hunting of new paths and the associated exchange of messages between SMs. The path reservations are dynamic in that they are adjusted by the SMs as traffic patterns change.

Each reserved bidirectional path between two SMs has one of the SMs defined as the owner. Ownership is defined to circumvent glare conditions that would otherwise develop from two SMs attempting to use the same reserved path at approximately the same time. An owning SM may use a reserved path without negotiating with the non-owner SM at the other end. The non-owner must ask the owner to relinquish ownership before the non-owner can use the reserved path.

By virtue of its ownership of a reserved path, an SM owns the channels included in such reserved path. An SM also owns any of the channels TS0 through TS511 between that SM and TMS 2010 that are not reserved—the SM can assign non-reserved channels to calls without negotiating with any other SM.

If no reserved path is idle between the originating and terminating SMs for a call, a new path between the two SMs must be negotiated. The negotiation begins by a first SM sending a copy of its map of idle time slots to the second SM which compares this map with its own map of idle time slots to find a common time slot that is idle in both SMs. The first SM must be informed of the results of the path hunt, the TMS 2010 connection must be made, and E-bit continuity must be sent and received at each end before the path is considered complete.

Whenever a new path is hunted, the time slot that is selected may be currently assigned to a reserved path going to a different SM. This conflict can occur at either end of the new path or at both ends. In each case, the existing reserved path must be removed and its time slot reassigned to the new path. The procedure for removing the reserved path depends on whether the initiating SM is the owner or not. If the owning SM wants to remove the reserved path, it may immediately do so, but a message must be sent to the non-owning SM to notify it that the time slot should be released at its end. If the non-owning SM wants to remove the reserved path, it must first send a message to the owning SM to request a release of the reserved path. If the owning SM returns an acknowledgement message giving consent, the non-owning SM can use this time slot knowing that the owning SM has already released the reserved path.

Each SM stores information concerning its 512 associated channels TS0 through TS511 in a memory in its module control unit. The stored information includes a reservation/ownership table, a call assignment table, and three bit maps X, Y, and Z. The reservation/ownership table for SM 3000-N is shown in FIG. 4. The table defines the following for each of the channels TS0 through TS511: (1) whether the channel is reserved (1) to any SM or non-reserved (0); (2) for reserved channels, which SM the channel is reserved to; and (3) which SM is the owner of the channel. Note that in the table of FIG. 4, there are six reserved paths between SM 3000-1 and SM 3000-N, two owned by SM 3000-1 and four owned by SM 3000-N. The call assignment table for SM 3000-N is shown in FIG. 5. The table defines the network time slot or channel assigned to each active call to or from that SM. The bit maps X, Y, and Z for SM 3000-N are shown in FIGS. 6, 7, and 8. Each bit map comprises 512 bits, one for each of the 512 channels TS0 through TS511. In bit map X, a zero indicates that a channel is presently not reserved to any SM and idle. In bit map Y, a zero indicates that a channel is presently owned by SM 3000-N (either not associated with a reserved path or, if it is part of a reserved path, it is owned by SM 3000-N) and idle. In bit map Z, a zero indicates that a channel is presently idle.

Figure 9:
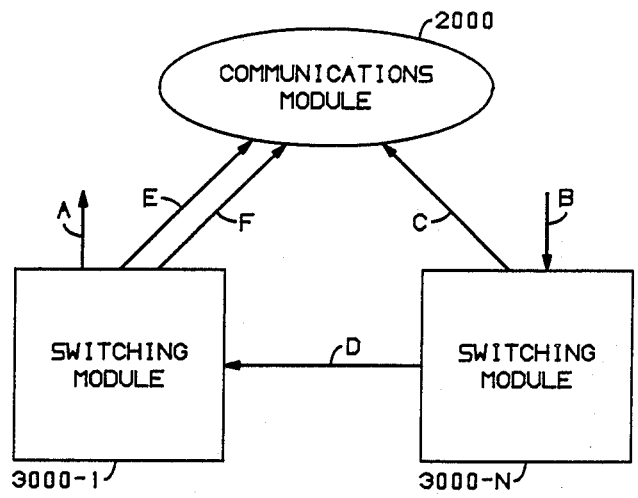
FIGS. 9 through 13 are functional control message diagrams corresponding to five call processing examples illustrating the path reservation arrangement of the system of FIG. 1.

Five examples illustrating the setup of inter-module calls between SMs 3000-1 and 3000-N are described hereafter. The examples illustrate five phases that call processing goes through if each successive phase is unsuccessful in finding a path for the call. FIG. 9 illustrates the first example. A call request is originated from a line served by SM 3000-1. SM 3000-1 transmits a route request message (A) to one of the other SMs (not shown) that serves as the routing module for the particular directory number that was called. The routing module performs the translation of the directory number and determines that the call is to be terminated to a line served by SM 3000-N. The routing module then transmits a termination request message (B) to SM 3000-

N. SM 3000-N checks its reservation/ownership table and bit map Z to determine whether it owns an idle reserved path between SM 3000-N and SM 3000-1. If it does, the channel is marked busy in the bit maps X, Y, and Z and assigned to the call in the call assignment table (FIG. 5). SM 3000-N sends E-bit continuity (C) to CM 2000 and begins E-bit scanning. The network time slot chosen for the call is then used to transmit audible ring. The identity of the chosen network time slot is passed to SM 3000-1 in a setup completion message (D).

SM 3000-1 marks the time slot busy in its bit maps X, Y, and Z, and proceeds with path setup by sending a connect order message (E) to CM 2000. SM 3000-1 also sends E-bit continuity (F) to CM 2000, begins E-bit scanning, and closes the path through its TSIU to the appropriate peripheral time slot.

Figure 10:
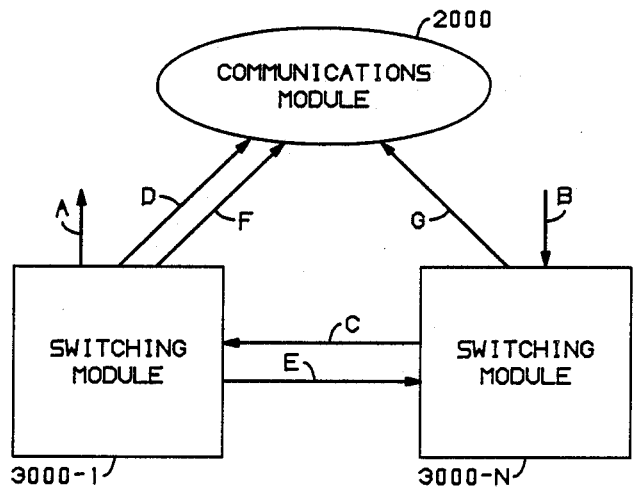

FIG. 10 illustrates the second example. The route request message (A) and the termination request message (B) are transmitted as before. SM 3000-N checks its reservation/ownership table and bit map Z to determine whether it owns an idle reserved path between SM 3000-N and SM 3000-1. In this example, all of the idle reserved paths between SM 3000-N and SM 3000-1 are owned by SM 3000-1. SM 3000-N selects one of the reserved paths owned by SM 3000-1 and marks it busy and assigned for the call subject to confirmation from SM 3000-1. The call proceeds similarly but SM 3000-N does not send E-bit continuity immediately since the same reserved path may be selected by SM 3000-1 for another call at about the same time. SM 3000-N sends a setup completion message (C) to SM 3000-1. In response, SM 3000-1 sends a connect order message (D) to CM 2000, closes the path through its TSIU, and sends a confirmation message (E) to SM 3000-N to confirm that SM 3000-1 has given up ownership of the reserved path. SM 3000-1 also sends E-bit continuity (F) and begins E-bit scanning. After receiving the confirmation message (E), SM 3000-N transmits E-bit continuity (G), and begins E-bit scanning. It is highly improbable that SM 3000-1 would deny the request of SM 3000-N for ownership; however, if it does, call processing proceeds to the next phase.

Figure 11:
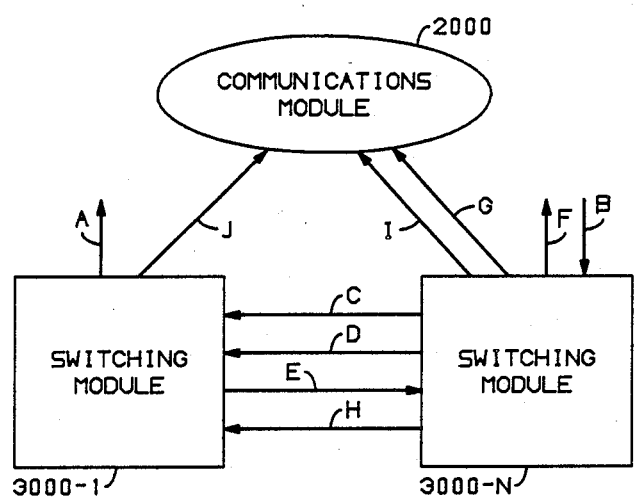

FIG. 11 illustrates the third example. The route request message (A) and the termination request message (B) are transmitted as before. However, in this example, SM 3000-N checks its reservation/ownership table and bit map Z and determines that there are no idle reserved paths between SM 3000-N and SM 3000-1. SM 3000-N then transmits a time slot map message (C), including its bit map Y, to SM 3000-N. Recall that bit map Y defines the idle owned time slots. The time slot map message (C) is transmitted to SM 3000-N prior to transmission of a setup completion message (D).

When SM 3000-1 receives the time slot map message (C), it looks for a match (corresponding zeros) between its bit map X (nonreserved and idle time slots) and the bit map Y for SM 3000-N included in the message. If a match is found, SM 3000-1 sends a new reserved path message (E) to SM 3000-N defining the network time slot that is to be reserved for connecting SM 3000-1 and SM 3000-N. By the time the new reserved path message is received by SM 3000-N, it is possible that the time slot has been chosen for a different new reserved path from SM 3000-N and is now busy. If this occurs the transmission of the time slot map message to SM 3000-1 and the matching between the bit map Y included in the message and the bit map X of SM 3000-1 is repeated.

If the chosen time slot defined by the new reserved path message (E) is idle and owned by SM 3000-N as part of a different reserved path to another SM, the other SM is notified via a message (F) that the previously reserved path between that SM and SM 3000-N is no longer reserved.

When the chosen time slot is accepted by SM 3000-N, a connect order message (G) is sent to CM 2000 such that the appropriate path is established through TMS 2010. SM 3000-N marks the time slot as busy and owned by SM 3000-N. SM 3000-N then returns a confirmation message (H) to SM 3000-1, begins transmitting E-bit continuity (I) to CM 2000, and begins E-bit scanning.

In response to the confirmation message (H), SM 3000-1 transmits E-bit continuity (J) to CM 2000 and begins E-bit scanning. SM 3000-N will receive the E-bit continuity to complete call setup.

Figure 12:
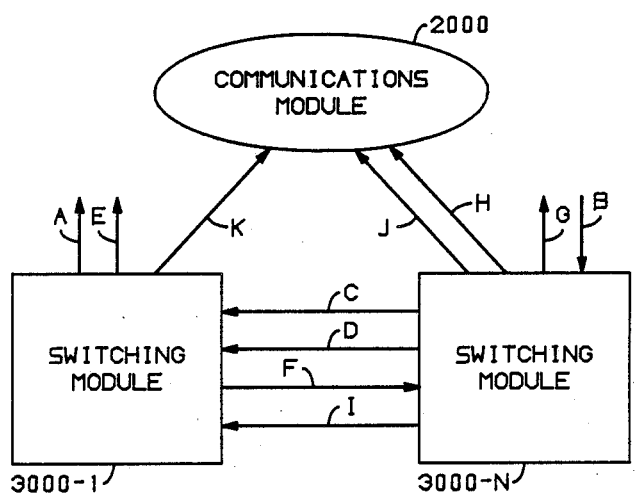

FIG. 12 illustrates the fourth example. The route request message (A) and the termination request message (B) are transmitted as before. SM 3000-N checks its reservation/ownership table and bit map Z and determines that there are no idle reserved paths between SM 3000-N and SM 3000-1. SM 3000-N then transmits a time slot map message (C), including its bit map Y, to SM 3000-N. The time slot map message (C) is transmitted to SM 3000-N prior to transmission of a setup completion message (D).

When SM 3000-1 receives the time slot map message (C), it looks for a match between its bit map X (nonreserved and idle time slots) and the bit map Y for SM 3000-N included in the message. In accordance with the fourth example, no match is found. SM 3000-1 then looks for a match between its bit map Y (owned and idle time slots) and the bit map Y for SM 3000-N. If a match is found and the chosen time slot is part of a reserved path to another SM, the other SM is notified via a message (E) that the previously reserved path between that SM and SM 3000-1 is no longer reserved. SM 3000-1 sends a new reserved path message (F) to SM 3000-N defining the network time slot that is to be reserved for connecting SM 3000-1 and SM 3000-N.

If the chosen time slot defined by the new reserved path message (F) is idle and owned by SM 3000-N as part of a different reserved path to another SM, the other SM is notified via a message (G) that the previously reserved path between that SM and SM 3000-N is no longer reserved.

When the chosen time slot is accepted by SM 3000-N, a connect order message (H) is sent to CM 2000 such that the appropriate path is established through TMS 2010. SM 3000-N marks the time slot as busy and owned by SM 3000-N. SM 3000-N then returns a confirmation message (I) to SM 3000-1, begins transmitting E-bit continuity (J) to CM 2000, and begins E-bit scanning.

In response to the confirmation message (I), SM 3000-1 transmits E-bit continuity (K) to CM 2000 and begins E-bit scanning. SM 3000-N will receive the E-bit continuity to complete call setup.

Figure 13:
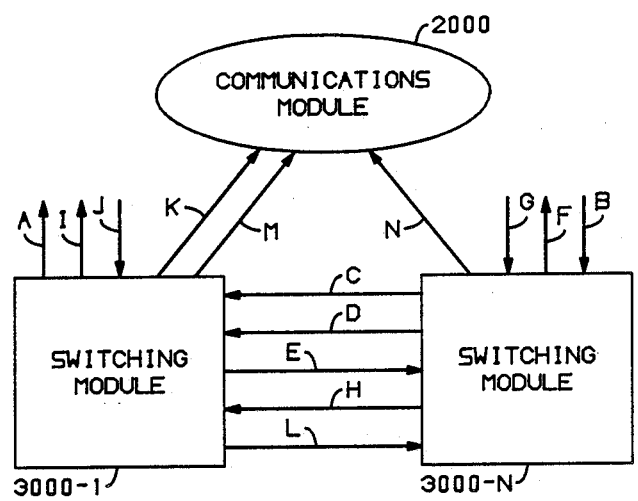

FIG. 13 illustrates the fifth example. The route request message (A) and the termination request message (B) are transmitted as before. SM 3000-N checks its reservation/ownership table and bit map Z and determines that there are no idle reserved paths between SM 3000-N and SM 3000-1. SM 3000-N then transmits a time slot map message (C), including its bit map Y, to SM 3000-N. The time slot map message (C) is transmitted to SM 3000-N prior to transmission of a setup completion message (D).

When SM 3000-1 receives the time slot map message (C), it looks for a match between its bit map X (nonreserved and idle time slots) and the bit map Y for SM 3000-N included in the message. No match is found. SM 3000-1 then looks for a match between its bit map Y (owned and idle time slots) and the bit map Y for SM 3000-N. In accordance with the fifth example, again no match is found. At this point, SM 3000-1 transmits a time slot map message (E) including its bit map Z (all idle time slots) to SM 3000-N. When SM 3000-N receives the time slot map message (E), it looks for a match between its bit map Z and the bit map Z for SM 3000-1 included in the message. If no match is found, the call is blocked. If a match is found, the chosen time slot is likely to be part of a reserved path to another SM. If this reserved path is not owned by SM 3000-N, ownership must first be reversed before the time slot can be accepted. This involves sending a message (F) and waiting for an acknowledgement message (G) from the other SM. If the chosen time slot is part of a reserved path that is owned by SM 3000-N, the other SM need only be notified and no acknowledgement message is necessary. SM 3000-N sends a new reserved path message (H) to SM 3000-1 defining the network time slot that is to be reserved for connecting SM 3000-1 and SM 3000-N.

The chosen time slot defined by the new reserved path message (H) is likely to be part of a reserved path between SM 3000-1 and another SM. If this reserved path is not owned by SM 3000-1, ownership must first be reserved before the time slot can be accepted. This involves sending a message (I) and waiting for an acknowledgement message (J) from the other SM. If the chosen time slot is part of a reserved path that is owned by SM 3000-1, the other SM need only be notified and no acknowledgement message is necessary.

When the chosen time slot is accepted by SM 3000-1, a connect order message (K) is sent to CM 2000 such that the appropriate path is established through TMS 2010. SM 3000-1 marks the time slot as busy and owned by SM 3000-1. SM 3000-1 then returns a confirmation message (L) to SM 3000-N, begins transmitting E-bit continuity (M) to CM 2000, and begins E-bit scanning.

In response to the confirmation message (L), SM 3000-N transmits E-bit continuity (N) to CM 2000 and begins E-bit scanning. SM 3000-1 will receive the E-bit continuity to complete call setup.

In the present embodiment, once a path has been established through TMS 2010 and reserved for connecting two SMs, the path is retained for future calls between those SMs until the reservation is removed to avoid blocking by TMS 2010. Therefore, the connect order message transmitted in the first two examples described above is not needed operationally to cause the path to be set up. The messages are transmitted however to enhance the integrity and maintainability of system 1000.

The bit map comparisons (Y against X, Y against Y, Z against Z) are performed in the order indicated so that the total number of reserved paths in system 1000 becomes neither too large, leaving few paths available, for example, for intra-module calls, or too small, thus requiring performance of a new path hunt for a high percentage of calls.

In addition to being useful with respect to reserved paths and channels through a switch, communication channel ownership and the dynamic adjustment of ownership on a per-call basis are also applicable to two-way trunks between switching systems.

What is claimed is:

1. In an arrangement comprising a plurality of bidirectional communication channels between first and second call means, a method of processing a call between said first and second call means comprising
   (A) defining at least one of said plurality of channels as being owned by said first call means and at least one other of said plurality of channels as being owned by said second call means,
   (B) in response to a call request for said call, determining whether there is a channel of said plurality of channels that is presently owned by said first call means and idle,
   (C) upon determining no channel in step (B), determining whether there is a channel of said plurality of channels that is presently owned by said second call means and idle, and
   (D) upon determining a channel in step (C), redefining said channel determined in step (C) as being owned by said first call means, wherein said call is originated from said first call means and terminated to said second call means, wherein channels owned by said first call means are assignable for calls originated from said first call means and terminated to said second call means, and wherein channels owned by said second call means are assignable for calls originated from said second call means and terminated to said first call means.

2. A method in accordance with claim 1 further comprising
   (E) upon determining said channel in step (C), assigning for said call said channel determined in step (C).

3. A method in accordance with claim 2 wherein said first and second call means each comprise means for storing status information for said plurality of channels, wherein step (B) comprises
   (B1) in response to said call request, determining whether there is a channel of said plurality of channels that is defined by the status information stored by said first call means as being presently owned by said first call means and idle, wherein step (C) comprises
   (C1) upon determining no channel in step (B1), determining whether there is a channel of said plurality of channels that is defined by the status information stored by said first call means as being presently owned by said second call means and idle, and
   (C2) upon determining a channel in step (C1), determining whether said channel determined in step (C1) is defined by the status information stored by said second call means as being presently owned by said second call means and idle, and wherein step (D) comprises
   (D1) upon an affirmative determination in step (C2), redefining said channel determined in step (C1) as being owned by said first call means.

4. A method in accordance with claim 3 wherein step (D) further comprises
   (D2) upon said affirmative determination in step (C2), assigning for said call said channel determined in step (C1).

5. In an arrangement comprising a plurality of bidirectional communication channels between first and second call means, a call processing method comprising allocating a first group of said channels to be used for calls originating from said first call means and terminating to said second call means, and a second group of said channels for calls originating from said second call means and terminating to said first call means, in response to a call request for a call originating from said first call means and terminating to said second call means, determining whether said first group includes an idle channel, and upon determining no idle channel in said determining step, assigning an idle channel of said second group for said call and reallocating said last-mentioned channel from said second group to said first group.

6. In an arrangement comprising a plurality of call means each for communicating in and storing status information for an associated plurality of channels, and switch means for providing switched connections among said call means such that each of said channels associated with any given one of said call means is connectable with a corresponding one of said channels associated with any other one of said call means, a method of processing a call between first and second ones of said call means comprising (A) in response to a call request for said call, determining whether there is a channel associated with said first call means that is defined by the status information stored by said first call means as presently idle, reserved for connecting said first and second call means, and owned by said first call means, and (B) upon determining no channel in step (A), determining whether there is a channel associated with said second call means that is defined by the status information stored by said second call means as presently idle, reserved for connecting said first and second call means, and owned by said second call means.

7. A method in accordance with claim 6 further comprising (C) upon determining a channel in step (A), assigning for said call said channel determined in step (A) and a corresponding channel associated with said second call means.

8. A method in accordance with claim 7 further comprising (D) upon determining a channel in step (B), assigning for said call said channel determined in step (B) and a corresponding channel associated with said first call means.

9. A method in accordance with claim 8 further comprising (E) upon determining said channel in step (B), changing the status information stored by said first and second call means to define said channel determined in step (B) and a corresponding channel associated with said first call means as being owned by said first call means.

10. A method in accordance with claim 9 further comprising (F) upon determining no channel in step (B), determining whether there is a channel associated with one of said first and second call means that is defined by the status information stored by said one of said first and second call means as presently idle and owned by said one of said first and second call means, and that has a corresponding channel associated with the other of said first and second call means and defined by the status information stored by said other of said first and second call means as presently idle, and non-reserved.

11. A method in accordance with claim 10 further comprising (G) upon determining no channel in step (F), determining whether there is a channel associated with said one of said first and second call means that is defined by the status information stored by said one of said first and second call means as presently idle and owned by said one of said first and second call means, and that has a corresponding channel associated with said other of said first and second call means and defined by the status information stored by said other of said first and second call means as presently idle and owned by said other of said first and second call means.

12. A method in accordance with claim 11 further comprising (H) upon determining no channel in step (G), determining whether there is a channel associated with said one of said first and second call means that is defined by the status information stored by said one of said first and second call means as presently idle, and that has a corresponding channel associated with said other of said first and second call means and defined by the status information stored by said other of said first and second call means as presently idle.

13. A method in accordance with claim 12 further comprising (I) upon determining a channel in one of said steps (F), (G), and (H), assigning for said call said channel determined in said one step and a corresponding channel associated with said other of said first and second call means.

14. A method in accordance with claim 13 further comprising (J) upon determining said channel in said one step, changing the status information stored by said one and said other of said first and second call means to define said channel determined in said one step and a corresponding channel associated with said other of said first and second call means as being reserved for connecting said one and said other of said first and second call means and as being owned by one of said one and said other of said first and second call means.

15. A method in accordance with claim 6 further comprising (C) upon determining a channel in step (B), assigning for said call said channel determined in step (B) and a corresponding channel associated with said first call means.

16. A method in accordance with claim 6 further comprising (C) upon determining a channel in step (B), changing the status information stored by said first and second call means to define said channel determined in step (B) and a corresponding channel associated with said first call means as being owned by said first call means.

17. A method in accordance with claim 6 further comprising (C) upon determining no channel in step (B), determining whether there is a channel associated with one of said first and second call means that is defined by the status information stored by said one of said first and second call means as presently idle and owned by said one of said first and second call means, and that has a corresponding channel associated with the other of said first and second call means and defined by the status information stored by said other of said first and second call means as presently idle and non-reserved.

18. A method in accordance with claim 17 further comprising
   (D) upon determining no channel in step (C), determining whether there is a channel associated with said one of said first and second call means that is defined by the status information stored by said one of said first and second call means as presently idle and owned by said one of said first and second call means, and that has a corresponding channel associated with said other of said first and second call means and defined by the status information stored by said other of said first and second call means as presently idle and owned by said other of said first and second call means.

19. A method in accordance with claim 18 further comprising
   (E) upon determining no channel in step (D), determining whether there is a channel associated with said one of said first and second call means that is defined by the status information stored by said one of said first and second call means as presently idle, and that has a corresponding channel associated with said other of said first and second call means and defined by the status information stored by said other of said first and second call means as presently idle.

20. A method in accordance with claim 19 further comprising
   (F) upon determining a channel in one of said steps (C), (D), and (E), assigning for said call said channel determined in said one step and a corresponding channel associated with said other of said first and second call means.

21. A method in accordance with claim 19 further comprising
   (F) upon determining a channel in one of said steps (C), (D), and (E), changing the status information stored by said one and said other of said first and second call means to define said channel determined in said one step and a corresponding channel associated with said other of said first and second call means as being reserved for connecting said one and said other of said first and second call means and as being owned by one of said one and said other of said first and second call means.

22. A method in accordance with claim 6 further comprising
   (C) upon determining no channel in step (B), determining whether there is a channel associated with said first call means that is defined by the status information stored by said first call means as presently idle, and that has a corresponding channel associated with said second call means and defined by the status information stored by said second call means as presently idle.

23. A method in accordance with claim 22 further comprising
   (D) upon determining a channel in step (C), assigning for said call said channel determined in step (C) and a corresponding channel associated with said second call means.

24. A method in accordance with claim 22 further comprising
   (D) upon determining a channel in step (C), changing the status information stored by said first and second call means to define said channel determined in step (C) and a corresponding channel associated with said second call means as being reserved for connecting said first and second call means and as being owned by one of said first and second call means.

25. In an arrangement comprising a plurality of call means each for communicating in and storing status information for an associated plurality of channels, and switch means for providing switched connections among said call means such that each of said channels associated with any given one of said call means is connectable with a corresponding one of said channels associated with any other one of said call means, a method of processing a call between first and second ones of said call means comprising
   (A) in response to a call request for said call, determining whether there is a channel associated with said first call means that is defined by the status information stored by said first call means as presently idle, reserved for connecting said first and second call means, and owned by said first call means,
   (B) upon determining no channel in step (A), determining whether there is a channel associated with said first call means that is defined by the status information stored by said first call means as presently idle, reserved for connecting said first and second call means, and owned by said second call means, and
   (C) upon determining a channel in step (B), determining whether there is a channel associated with said second call means that corresponds to said channel determined in step (B) and that is defined by the status information stored by said second call means as presently idle, reserved for connecting said first and second call means, and owned by said second call means.

26. A method in accordance with claim 25 further comprising
   (D) upon determining a channel in step (A), assigning for said call said channel determined in step (A) and a corresponding channel associated with said second call means.

27. A method in accordance with claim 26 further comprising
   (E) upon determining said channel in step (B), tentatively assigning for said call said channel determined in step (B) and a corresponding channel associated with said second call means, and
   (F) upon an affirmative determination in step (C), confirming the tentative assignment made in step (E).

28. A method in accordance with claim 27 further comprising
   (G) upon said affirmative determination in step (C), changing the status information stored by said first and second call means to define said channel determined in step (B) and a corresponding channel associated with said second call means as being owned by said first call means.

29. An arrangement comprising
first and second call means and
a plurality of bidirectional communication channels, said first and second call means each comprising
  means for storing ownership, busy/idle status, and
  call assignment information for said plurality of
  channels,
said first call means further comprising means for
  transmitting a signal to said second call means, in
  response to a call request for a call between said
  first and second call means, when said ownership
  and busy/idle status information stored by said first
  call means indicates that none of said plurality of
  channels is both idle and owned by said first call
  means, and
said second call means further comprising means
  responsive to said signal for determining one of
  said plurality of channels that is indicated by said
  ownership and busy/idle status information stored
  by said second call means to be idle and owned by
  said second call means, and means for updating said
  ownership, busy/idle status, and call assignment
  information stored by said second call means to
  indicate that said determined channel is now
  owned by said first call means, busy, and assigned
  for said call.

30. An arrangement in accordance with claim 29
wherein said transmitting means transmits a signal
  defining one of said channels to said second call
  means, in response to said call request for said call
  between said first and second call means, when said
  ownership and busy/idle status information stored
  by said first call means indicates that none of said
  plurality of channels is both idle and owned by said
  first call means and that said defined channel is
  both idle and owned by said second call means,
wherein said determining means responds to said
  signal defining one of said channels by verifying
  that said defined channel is indicated by said own-
  ership and busy/idle status information stored by
  said second call means to be idle and owned by said
  second call means, and
wherein said updating means is responsive to said
  determining means for updating said ownership,
  busy/idle status, and call assignment information
  stored by said second call means to indicate that
  said defined channel is now owned by said first call
  means, busy, and assigned for said call.

31. An arrangement in accordance with claim 29
wherein said call is originated from said first call means
and terminated to said second call means, wherein chan-
nels owned by said first call means are assignable for
calls originated from said first call means and termi-
nated to said second call means, and wherein channels
owned by said second call means are assignable for calls
originated from said second call means and terminated
to said first call means.

32. An arrangement in accordance with claim 29
wherein said call is originated from said second call
means and terminated to said first call means, wherein
channels owned by said first call means are assignable
for calls originated from said second call means and
terminated to said first call means, and wherein chan-
nels owned by said second call means are assignable for
calls originated from said first call means and termi-
nated to said second call means.

33. An arrangement comprising
a plurality of call means each for communicating in
  an associated plurality of channels,
switch means for providing switched connections
  among said call means such that each of said chan-
nels associated with any given one of said call
  means is connectable with a corresponding one of
  said channels associated with any other one of said
  call means,
each of said call means further comprising means for
  storing ownership, busy/idle status, and call assign-
  ment information for its associated plurality of
  channels,
a first one of said call means forther comprising
  means for transmitting a signal to a second one said
  call means, in response to a call request for a call
  between said first and second call means, when said
  ownership and busy/idle status information stored
  by said first call means indicates that none of said
  plurality of channels associated with said first call
  means is both idle and owned by said first call
  means, and
said second call means further comprising means
  responsive to said signal for determining one of
  said plurality of channels that is indicated by said
  ownership and busy/idle status information stored
  by said second call means to be idle and owned by
  said second call means, and means for updating said
  ownership, busy/idle status, and call assignment
  information stored by said second call means to
  indicate that said determined channel is now
  owned by said first call means, busy, and assigned
  for said call.

34. An arrangement in accordance with claim 33
wherein said call is originated from said first call means
and terminated to said second call means, wherein chan-
nels owned by said first call means are assignable for
calls originated from said first call means and termi-
nated to said second call means, and wherein channels
owned by said second call means are assignable for calls
originated from said second call means and terminated
to said first call means.

35. An arrangement in accordance with claim 33
wherein said call is originated from said second call
means and terminated to said first call means, wherein
channels owned by said first call means are assignable
for calls originated from said second call means and
terminated to said first call means, and wherein chan-
nels owned by said second call means are assignable for
calls originated from said first call means and termi-
nated to said second call means.

36. An arrangement comprising
a plurality of call means each for communicating in
  an associated plurality of channels,
switch means for providing switched connections
  among said call means such that each of said chan-
  nels associated with any given one of said call
  means is connectable with a corresponding one of
  said channels associated with any other one of said
  call means,
each of said call means further comprising means for
  storing ownership, busy/idle status, and call assign-
  ment information for its associated plurality of
  channels,
a first one of said call means further comprising
  means for transmitting a signal to a second one of
  said call means defining one of said channels associ-
  ated with said first call means, in response to a call
  request for a call between said first and second call
  means, when said ownership and busy/idle status
  information stored by said first call means indicates
  that none of said plurality of channels associated
  with said first call means, is both idle and owned by said first call means and that said defined channel is both idle and owned by said second call means, and said second call means further comprising means responsive to said signal for verifying that the channel associated with said second call means that corresponds to said defined channel is indicated by said ownership and busy/idle status information stored by said second call means to be idle and owned by said second call means, and means responsive to said verifying means for updating said ownership, busy/idle status, and call assignment information stored by said second call means to indicate that said channel corresponding to said defined channel is now owned by said first call means, busy, and assigned for said call.

37. An arrangement in accordance with claim 36 herein said call is originated from said first call means and terminated to said second call means, wherein channels owned by said first call means are assignable for calls originated from said first call means and terminated to said second call means, and wherein channels owned by said second call means are assignable for calls originated from said second call means and terminated to said first call means.

38. An arrangement in accordance with claim 36 wherein said call is originated from said second call means and terminated to said first call means, wherein channels owned by said first call means are assignable for calls originated from said second call means and terminated to said first call means, and wherein channels owned by said second call means are assignable for calls originated from said first call means and terminated to said second call means.

39. In an arrangement comprising a plurality of bidirectional communication channels between first and second call means, a method of processing a call between said first and second call means comprising
(A) defining at least one of said plurality of channels as being owned by said first call means and at least one other of said plurality of channels as being owned by said second call means,
(B) in response to a call request for said call, determining whether there is a channel of said plurality of channels that is presently owned by said first call means and idle
(C) upon determining no channel in step (B), determining whether there is a channel of said plurality of channels that is presently owned by said second call means and idle, and
(D) upon determining a channel in step (C), redefining said channel determined in step (C) as being owned by said first call means, wherein said call is originated from said second means and terminated to said first call means, wherein channels owned by said first call means are assignable for calls originated from said second call means and terminated to said first call means, and wherein channels owned by said second call means are assignable for calls originated from said first call means and terminated to said second call means.

40. A method in accordance with claim 39 further comprising
(E) upon determining said channel in step (C), assigning for said call said channel determined in step (C).

41. A method in accordance with claim 40 wherein said first and second call means each comprise means for storing status information for said plurality of channels, wherein step (B) comprises
(B1) in response to said call request, determining whether there is a channel of said plurality of channels that is defined by the status information stored by said first call means as being presently owned by said first call means and idle, wherein step (C) comprises
(C1) upon determining no channel in step (B1), determining whether there is a channel of said plurality of channels that is defined by the status information stored by said first call means as being presently owned by said second call means and idle, and
(C2) upon determining a channel in step (C1), determining whether said channel determined in step (C1) is defined by the status information stored by said second call means as being presently owned by said second call means and idle, and wherein step (D) comprises
(D1) upon an affirmative determination in step (C2), redefining said channel determined in step (C1) as being owned by said first call means.

42. A method in accordance with claim 41 wherein step (D) further comprises
(D2) upon said affirmative determination in step (C2), assigning for said call said channel determined in step (C1).

* * * * *